United States Patent [19]

Shetty

[11] 3,862,949

[45] Jan. 28, 1975

[54] PREPARATION OF 3-ARYL AND 3-ARALKYL 6-SULFAMYL-7-HALO-1,3,4-TETRAHYDRO-4-QUINAZOLINONE

[75] Inventor: Bola Vithal Shetty, Rochester, N.Y.

[73] Assignee: Pennwalt Corporation, Philadelphia, Pa.

[22] Filed: Dec. 15, 1972

[21] Appl. No.: 315,702

Related U.S. Application Data

[63] Continuation of Ser. No. 50,895, June 29, 1970, abandoned, which is a continuation-in-part of Ser. No. 874,960, Nov. 7, 1969, abandoned, which is a continuation-in-part of Ser. No. 743,615, July 10, 1968, Pat. No. 3,567,746.

[52] U.S. Cl............................................. 260/256.5 R
[51] Int. Cl................................................ C07d 51/48
[58] Field of Search ............................. 260/256.5 R

[56] References Cited
UNITED STATES PATENTS

| | | | |
|---|---|---|---|
| 3,452,019 | 6/1969 | Shetty | 260/256.5 |
| 3,452,020 | 6/1969 | Shetty | 260/256.5 |
| 3,761,480 | 9/1973 | Shetty | 260/256.5 R |

FOREIGN PATENTS OR APPLICATIONS

| | | | |
|---|---|---|---|
| 15,09M | 10/1962 | France | 260/256.5 |

*Primary Examiner*—Richard J. Gallagher
*Attorney, Agent, or Firm*—Charles E. Feeny

[57] ABSTRACT

A process for preparing 3-aryl and 3-aralkyl-6-sulfamyl-1,2,3,4-tetrahydro-4-quinazolinone compounds suitable for use as diuretics, and particularly a process for preparing 2-methyl-3-o-tolyl-6-sulfamyl-7-chloro-1,2,3,4-tetrahydro-4-quinazolinone, by reacting a 5-halo-2-lower alkyl aniline with a lower alkyl haloformate to produce a N-carbalkoxy-5-halo-2-lower alkyl aniline, reacting said compound with a halosulfonic acid and ammonium hydroxide to produce N-carbalkoxy-5-halo-2-lower alkyl-4-sulfamyl aniline, reacting said sulfamyl aniline with potassium permanganate to produce N-carbalkoxy-4-halo-5-sulfamyl anthranilic acid, reacting said anthranilic acid compound with a cyclizing and condensing agent such as thionyl chloride to produce 7-chloro-6-sulfamyl-isatoic anhydride, reacting said isatoic anhydride with toluidine or other like aryl or aralkyl amine to produce the corresponding benzamide, and reacting said benzamide with a suitable cyclizing agent su;ch as an acetal, aldehyde or ketone to produce the desired diuretic quinazolinone compound.

4 Claims, No Drawings

PREPARATION OF 3-ARYL AND 3-ARALKYL 6-SULFAMYL-7-HALO-1,3,4-TETRAHYDRO-4-QUINAZOLINONE

This application is a continuation of application Ser. No. 50,895 filed June 29, 1970, now abandoned, which in turn is a continuation-in-part of application Ser. No. 874,960 filed Nov. 7, 1969, now abandoned (a continuation of which issued as U.S. Pat. No. 3,761,480), which in turn is a continuation-in-part of application Ser. No. 743,615 filed July 10, 1968, now U.S. Pat. No. 3,567,746.

The invention relates to a process of preparing 3-aryl and 3-aralkyl quinazolinones which are effective as diuretics, and more particularly relate to a process of preparing 6-sulfamyl-1,2,3,4-tetrahydro-4-quinazolinones represented by the formula

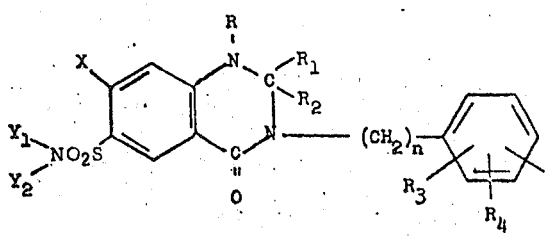

or a salt thereof, wherein

X is halogen or trifluoromethyl;

$Y_1$ and $Y_2$ are independently hydrogen, alkyl or acyl;

R is hydrogen, alkyl, aryl, or aralkyl;

$R_1$ and $R_2$ are independently hydrogen, alkyl, haloalkyl, hydroxyalkyl, alkoxyalkyl, thioalkyl, alkylthioalkyl, haloalkylthioalkyl, arylthioalkyl, cycloalkyl, cycloalkylalkyl, aryl or aralkyl; $R_1$ and $R_2$ taken together with the carbon atom to which they are attached are a cycloalkyl group or a heterocyclic group;

n is 0 or an integer from 1 to 4; and $R_3$, $R_4$ and $R_5$ are independently hydrogen, alkyl, alkoxy, hydroxy, halogen, trifluoromethyl, the radical $-SO_2NH_2$ or amino.

The terms "alkyl" and "alkoxy" denote alkyl and alkoxy groups which advantageously contain not more than 8 carbon atoms and preferably contain 1–4 carbon atoms.

Specific suitable compounds of the above formula include 2-methyl-3-o-tolyl-6-sulfamyl-7-chloro-1,2,3,4-tetrahydro-4-quinazolinone; 2-methyl-3-o-tolyl-6-sulfamyl-7-trifluoromethyl-1,2,3,4-tetrahydro-4-quinazolinone; 3-o-tolyl-6-sulfamyl-7-chloro-1,2,3,4-tetrahydro-4-quinazolinone; 2-ethyl-3-o-tolyl-6-sulfamyl-7-trifuloromethyl-1,2,3,4-tetrahydro-4-quinazolinone; 2-ethyl-3-o-tolyl-6-sulfamyl-7-chloro-1,2,3,4-tetrahydro-4-quinazolinone; 2-methyl-3-o-tolyl-6-methylaminosulfamyl-7-chloro-1,2,3,4-tetrahydro-4-quinazolinone; 2-methyl-3-(p-chlorophenyl)-6-sulfamyl-7-chloro-1,2,3,4-tetrahydro-4-quinazolinone; 2-methyl-3-o-tolyl-6-methylaminosulfamyl-7-chloro-1,2,3,4-tetrahydro-4-quinazolinone; 2-methyl-3-phenyl-6-sulfamyl-7-chloro-1,2,3,4-tetrahydro-4-quinazolinone; 2-methyl-3-(2'-methyl-3'-chlorophenyl)-6-sulfamyl-7-chloro-1,2,3,4-tetrahydro-4-quinazolinone; 2-methyl-3-(p-chlorophenyl)-6-methylaminosulfamyl-7-chloro-1,2,3,4-tetrahydro-4-quinazolinone; 2-methyl-3-(2'-methylbenzyl)-6-sulfamyl-7-chloro-1,2,3,4-tetrahydro-4-quinazolinone; 2-phenyl-3-o-tolyl-6-sulfamyl-7-chloro-1,2,3,4-tetrahydro-4-quinazolinone; 2-propyl-3-o-tolyl-6-sulfamyl-7-chloro-1,2,3,4-tetrahydro-4-quinazolinone; 2-butyl-3-o-tolyl6-sulfamyl-7-chloro-1,2,3,4-tetrahydro-4-quinazoninone; 2-propyl-3-o-tolyl-6-sulfamyl-7-trifuloromethyl-1,2,3,4-tetrahydro-4-quinazolinone; 2-butyl-3-o-tolyl-6-sulfamyl-7-trifuloromethyl-1,2,3,4-tetrahydro-4-quinazoninone; 2-benzylthiomethyl-3-o-tolyl-6-sulfamyl-7-chloro-1,2,3,4-tetrahydro-4-quinazolinone; 2-(2,2,2-trifluoroethylthiomethyl)-3-o-tolyl-6-sulfamyl-7-chloro-1,2,3,4-tetrahydro-4-quinazolinone; 2-ethylthiomethyl-3-o-tolyl-6-sulfamyl-7-chloro-1,2,3,4-tetrahydro-4-quinazolinone; 2-chloromethyl-3-o-tolyl-6-sulfamyl-7-chloro-1,2,3,4-tetrahydro-4-quinazolinone; 2-dichloromethyl-3-o-tolyl-6-sulfamyl-7-chloro-1,2,3,4-tetrahydro-4-quinazolinone; 2-trichloromethyl-3-o-tolyl-6-sulfamyl-7-chloro-1,2,3,4-tetrahydro-4-quinazolinone; 2-benzyl-3-o-tolyl-6-sulfamyl-7-chloro-1,2,3,4-tetrahydro-4-quinazolinone; 2-(3'-sulfamyl-4'-chlorophenyl)-3-o-tolyl-6-sulfamyl-7-chloro-1,2,3,4-tetrahydro-4-quinazolinone; 2-(3'-sulfamyl-4'-chlorobenzyl)-3-o-tolyl-6-sulfamyl-7-chloro-1,2,3,4-tetrahydro-4-quinazolinone; 2-methyl-3-(o-hydroxyphenyl)-6-sulfamyl-7-chloro-1,2,3,4-tetrahydro-4-quinazolinone; 2-methyl-3-(o-methoxyphenyl)-6-sulfamyl-7-chloro-1,2,3,4-tetrahydro-4-quinazolinone; 2-methyl-3-(p-aminophenyl)-6-sulfamyl-7-chloro-1,2,3,4-tetrahydro-4-quinazolinone; 2-methyl-3-(2'-methyl-4'-aminophenyl)-6-sulfamyl-7-chloro-1,2,3,4-tetrahydro-4-quinazolinone; 2-methyl-3-(2'-methyl-3'-sulfamylphenyl)-6-sulfamyl-7-chloro-1,2,3,4-tetrahydro-4-quinazolinone; 2-methyl-3-(2'-methyl-3'-sulfamylphenyl)-6-sulfamyl-7-trifluoromethyl-1,2,3,4-tetrahydro-4 -quinazolinone; 2-ethyl-3-(2'-methyl-3'-chlorophenyl)-6-sulfamyl-7-trifluoromethyl-1,2,3,4-tetrahydro-4-quinazolinone; 2-methyl-3-(2'-methyl-3'-chlorophenyl)-6-methylamino-sulfamyl-7-chloro-1,2,3,4-tetrahydro-4-quinazolinone; 2-ethyl-3-(2'-sulfamylphenyl)-6-sulfamyl-7-chloro-1,2,3,4-tetrahydro-4-quinazolinone; 2-cyclopentylmethyl-3-o-tolyl-6-sulfamyl-7-chloro-1,2,3,4-tetrahydro-4-quinazolinone; 2-cyclobutyl-3-o-tolyl-6-sulfamyl-7-chloro-1,2,3,4-tetrahydro-4-quinazolinone; 2-cyclobutyl-3-o-tolyl-6-sulfamyl-7-trifluoromethyl-1,2,3,4-tetrahydro-4-quinazolinone; 2-cyclopropyl-methyl-3-o-tolyl-6-sulfamyl-7-chloro-1,2,3,4-tetrahydro-4-quinazolinone; 2-cyclopropyl-3-o-tolyl-6-sulfamyl-7-trifluoromethyl-1,2,3,4-tetrahydro-4-quinazolinone; 2-methyl-3-benzyl-6-sulfamyl-7-chloro-1,2,3,4-tetrahydro-4-quinazolinone; 2-pentamethylene-3-o-tolyl-6-sulfamyl-7-chloro-1,2,3,4-tetrahydro-4-quinazolinone; 1,2-dimethyl-3-o-tolyl-6-sulfamyl-7-chloro-1,2,3,4-tetrahydro-4-quinazolinone; 1-benzyl-2-methyl-3-o-tolyl-6-sulfamyl-7-chloro-1,2,3,4-tetrahydro-4-quinazolinone; 2-methyl-3-(2'methyl-4'-chlorophenyl)-6-sulfamyl-7-chloro-1,2,3,4-tetrahydro-4-quinazolinone; 2-cyclobutylmethyl-3-o-tolyl-6-sulfamyl-7-chloro-1,2,3,4-tetrahydro-4-quinazolinone; 2-methyl-3-(2'-trifluoromethyl-4'-aminophenyl)-6-sulfamyl-7-chloro-1,2,3,4-tetrahydro-4-quinazolinone; the sodium salt of 2-methyl-3-o-tolyl-6-sulfamyl-7-chloro-1,2,3,4-tetrahydro-4-quinazolinone; the potassium salt of 2-methyl-3-o-tolyl-6-sulfamyl-7-chloro-1,2,3,4-tetrahydro-4-quinazolinone, and 2-methyl-3-(o-trifluoromethylphenyl)-6-sulfamyl-7-chloro-1,2,3,4-tetrahydro-4-quinazolinone which may be produced by the hydrogenation of 2-methyl-3-(o-trifluoromethylphenyl)-6-sulfamyl-7-chloro-4-(3H)-quinazolinone.

In my copending application Ser. No. 874,960, filed Nov. 7, 1969, the above compounds are prepared by a representative reaction scheme disclosed on page 6, showing the preparation of 2-methyl-3-(o-tolyl)-6-sulfamyl-7-chloro-1,2,3,4-tetrahydro-4-quinazolinone starting with 5-chloro-o-toluidine, (5-chloro-2-methylaniline) reacting this compound with acetic anhydride to produce 5-chloro-2-methylacetanilide (step 1), reacting this compound with chlorosulfonic acid and then reacting the reaction product with ammonium hydroxide to give 5-chloro-2-methyl-4-sulfamylacetanilide (steps 2 and 3), said product being reacted with potassium permanganate to give N-acetyl-4-chloro-5-sulfamylanthranilic acid (step 4), followed by refluxing with NaOH and then bringing to a pH of 4 with hydrochloric acid, and filtering to obtain 4-chloro-5-sulfamylanthranilic acid (step 5), the 4-chloro-5-sulfamylanthranilic acid was reacted with phosgene (COCl$_2$) to give 7-chloro-6-sulfamylisatoic anhydride (step 6), which was reacted with o-toludine to give 2-amino-4-chloro-5-sulfamyl-N-(o-tolyl)-benzamide (step 7), such benzamide then being reacted with dimethyl acetal or other acetal, aldehyde or acetone cyclizing agent to produce 2-methyl-3-(o-tolyl)-6-sulfamyl-7-chloro-1,2,3,4-tetrahydro-4-quinazolinone (step 8).

I have discovered that by substituting an aklyl haloformate such, as for example, ethylchloroformate, ethylbromoformate, isopropylchloroformate, and isopropylbromoformate for acetic anhydride in step 1 that step 5 involving refluxing the product of step 4 with NaOH and regulating the pH to about 4.0 can be eliminated. This can be accomplished by reacting the product of step 4 directly with thionyl chloride, polyphosphoric acid, P$_2$O$_5$, POCl$_3$, dicyclohexylcarbodiimide, and other cyclizing and condensing agents, thus directly producing the 7-chloro-5-sulfamylisatoic anhydride which is reacted with o-toluidine to form the benzamide and cyclized to produce the 3-aryl and 3-aralkyl-6-sulfamyl-7-halo-1,2,3,4-tetrahydro-4-quinazolinones. These 3-aryl and 3-aralkyl quinazolinones are produced by this process more economically than by the process disclosed in my aforesaid copending applications. The procedures shown in French Patent 1509M are similar to those of this invention, differing mainly in the use of different reagents after the production of the isatoic anhydride, such differences resulting in quinazolinones which are greatly inferior in diuretic properties to the quinazolinones produced by the process of this application.

In accordance with this invention the following steps are carried out:

Step 1

A 5-halo-2-lower alkyl-aniline is reacted with a lower alkyl haloformate to produce N-carbalkoxy-5-halo-2-lower alkyl-aniline which is removed from the reaction mixture. The reaction is carried out by heating in water to, for example, 30°–90°C, such as 70°C until the reaction is complete. The solid product is dissolved in a water immiscible solvent such as cyclohexane, and is crystallized from the solution by cooling to, for example, 20°C.

Steps II and III

An N-carbalkoxy-5-halo-2-lower alkyl-aniline is reacted with a halosulfonic acid to give a reaction product which is then reacted with ammonium hydroxide to give N-carbalkoxy-5-halo-2-lower alkyl-4-sulfamyl aniline. The first reaction is carried out, preferably, at a temperature below about 50°C, for example, 10°–50°C.

Step IV

The powdered product of Step III (N-carbalkoxy-5-halo-2-lower alkyl-4-sulfamyl aniline) is reacted with KMnO$_4$, preferably in mixture with magnesium sulfate, to product N-carbalkoxy-4-halo-5-sulfamyl anthranilic acid. The product of the reaction in solution may be mixed with sodium carbonate and filtered, the filtrate then acidified with hydrochloric acid and the product precipitated at substantially above 25°C, for example, 50°–90°C.

The product of Step III is preferably first treated with magnesium sulfate in mixture with water by heating at above 25°C, for example, 100°C. The oxidation with KMnO$_4$ is then brought about by adding solid or an aqueous solution of the KMnO$_4$ to the reaction mixture.

Step V

The N-carbalkoxy-4-halo-5-sulfamyl anthranilic acid of Step IV is reacted with a cyclizing and condensing agent, such as for example, thionyl halide (SOCl$_2$), POCl$_3$, P$_2$O$_5$, polyphosphoric acid or dicyclohexylcarbodiimide to produce 7-halo-6-sulfamylisatoic anhydride.

The reaction is carried out by heating the reactants in solvent such as in dioxane to reflux, — after reaction the mixture was cooled to precipitate out the solid isatoic anhydride and mixture filtered.

Step VI

The 7-halo-6-sulfamylisatoic anhydride of step V is reacted with toluidine or other aryl or aralkyl amine such as aniline, lower alkyl aniline or lower alkyl toluidine to produce 2-amino-4-halo-5-sulfamyl-N-(o-tolyl) benzamide or other N-aryl or N-aralkyl benzamide.

The reaction is preferably carried out by heating the reactants under nitrogen, argon or other inert gas at 150° – 190°C, and filtering out the solid benzamide so obtained.

Step VII

The benzamide of step VI is reacted with an acetal, aldehyde or ketone represented, respectively, by the formula

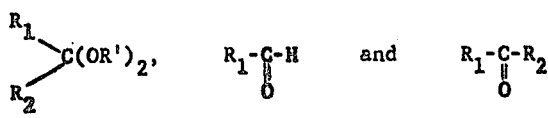

wherein R' is a hydrocarbon group; and,
a. when R is benzyl, optionally hydrogenating the product thus obtained to replace said benzyl with a hydrogen atom,
b. when Y$_1$ and Y$_2$ are hydrogen, optionally reacting the product thus obtained with an alkylating or acylating agent to replace at least one of the hydrogen atoms with an alkyl or acyl group, respectively, and, if desired, reacting the resulting product with an acid or a base to provide a salt.

The reaction is preferably carried out by adding the acetal or other cyclizing agent to a slurry of the benzamide in glacial acetic acid.

The product obtained is 3 (aryl or aryl lower alkyl)-6-fulfamyl-7-halo-1,2,3,4tetrahydro-4-quinazolinone, the product of the 2-hydrogen or 2-lower alkyl substituted quinazolinone compound depending upon the acetal, aldehyde or ketone used as a cyclizing agent. Dimethoxy methane, for example, will give the 2-hydrogen compound, and dimethyl acetal will give the 2-methyl substituted compound.

However, any of the quinazolinone compounds of the general formula first written above can also be prepared by modifying the reactant of steps I and VII in ways which will be apparent to those skilled in the art to produce a benzamide (anthranilamide) represented by the formula

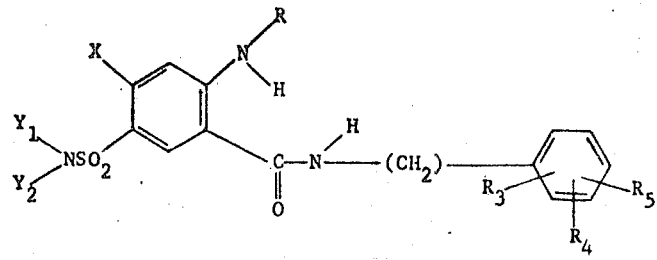

where $R_3$, $R_4$, $R_5$, R, X, $Y_1$ and $Y_2$ are the same as in the generic formula on page 2.

In the above steps the reagents are preferably used in equal molar or two or three times molar amounts of the product to be reacted so as to give a substantial amount of product for the next proceeding step, and for the final step.

The following is a schematic outline of my process for producing metolazone, one of the diuretic compounds of this invention:

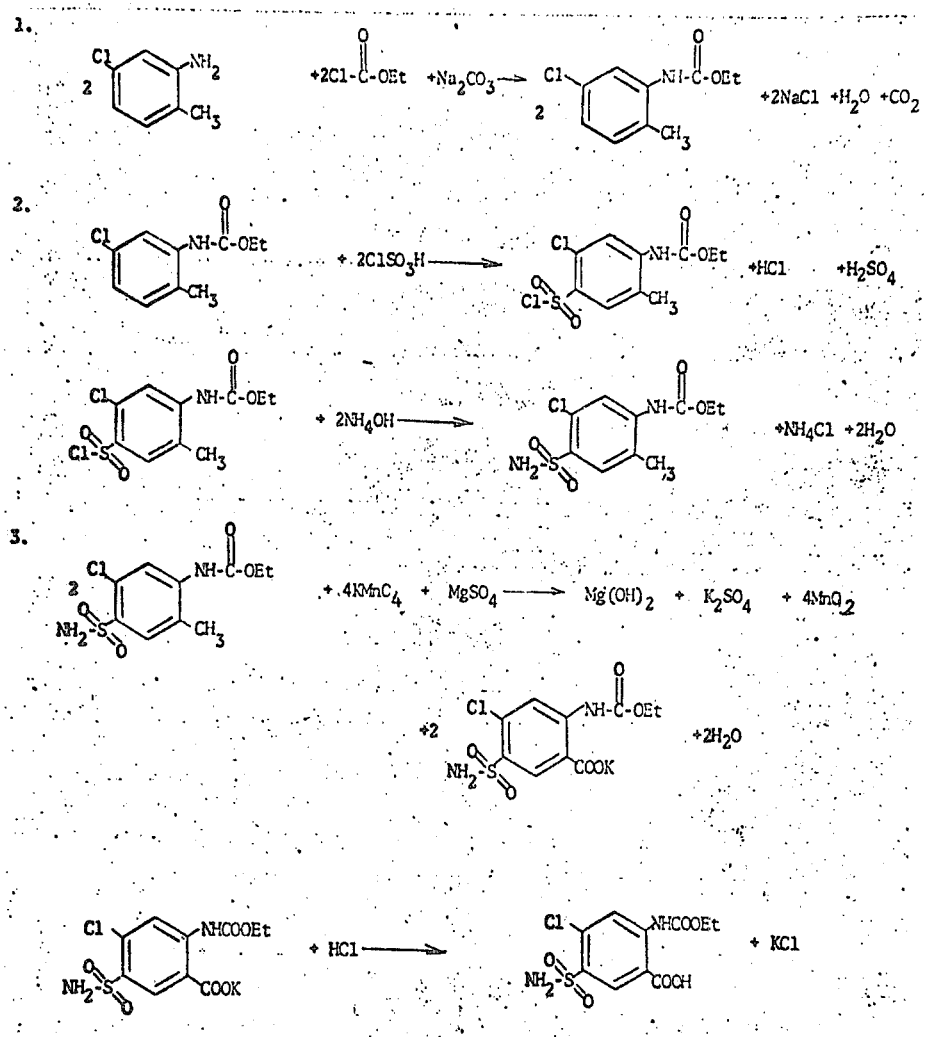

Balanced Equation for Method of Synthesis of Metolazone

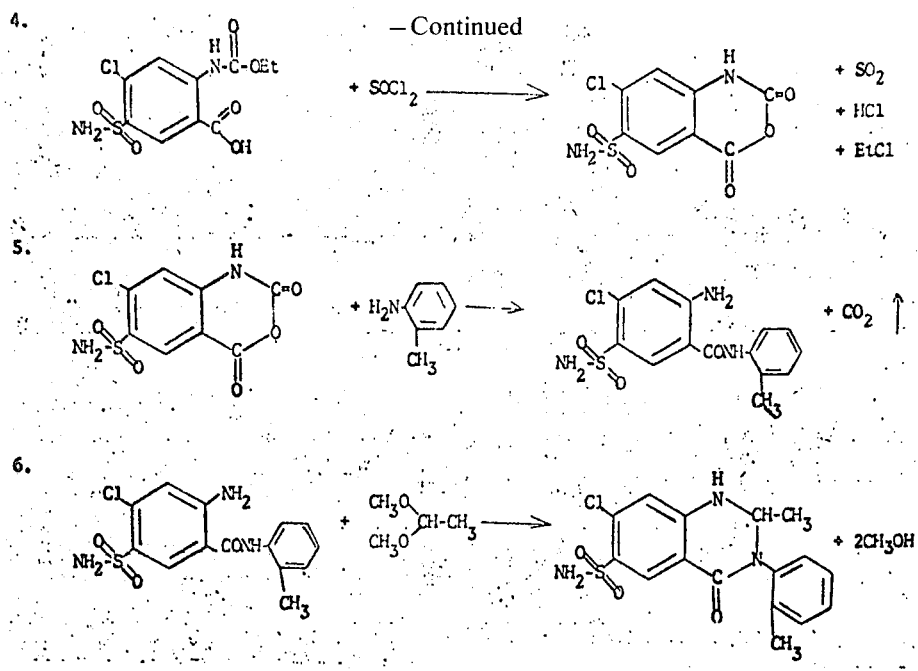

The following are specific examples illustrating the process of my invention:

Step I.

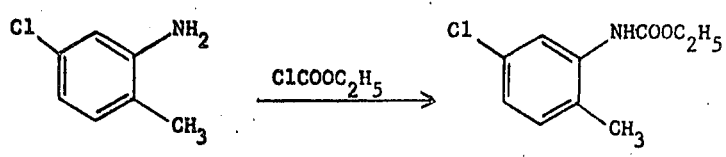

I

N-Carbethoxy-5-chloro-2-methyl-aniline

In a 12 liter flask 568 g of 5-chloro-2-methylaniline was added to 480 g of sodium carbonate anhydrous in 1,600 ml water. The mixture was heated to 70° and the mantle was removed. Ethyl chloroformate (480 ml) was added at a rate to maintain the temperature at 70°–75°. When addition was complete, the mixture was heated 1 hour at 70°–75°, cooled to 30° and filtered. The solid was washed with water, dissolved in 8 liters of hot cyclohexane and the water layer separated. The cyclohexane solution was cooled overnight and the solid filtered and dried to give 668 g, mp 70°–3°. The mother liquor was concentrated to 2.5 liters and then 800 ml to give 2nd and 3rd crops of 59 g and 28 g. Total yield = 755 g = 89% of theory.

N-Carbethoxy-5-chloro-2-methyl-4-sulfamylaniline

Chlorosulfonic acid (900 ml) was charged to a 5 liter flask and 600 g of N-carbethoxy-5-chloro-2-methylaniline added with cooling so that the temperature was below 50°. The mixture was kept at 50° for 24 hours, [1] and poured into a mixture of 600 ml water and 6.2 kg ice, adding the ice in portions so that the mixture can be stirred. After a few minutes the water was decanted off. [2] The solid was stirred for 1 hour with 3 liters of $CHCl_3$ and 3 liters concentrated $NH_4OH$, filtered, washed with water, and dried to give 572 g, mp 195°–201° (69% of theory).

([1] Temperature control is important. At 60° the product will be less pure. At 70° the yield will drop to 10% or less.
[2] To avoid possible hydrolysis of the sulfonyl chloride the reaction preferably should not be left at this stage.)

Step II and Step III.

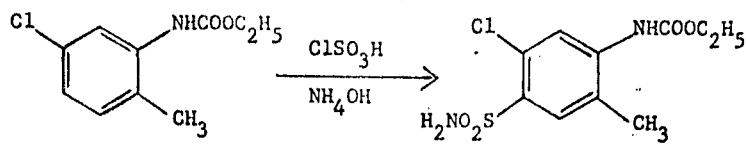

II and III

Step IV.

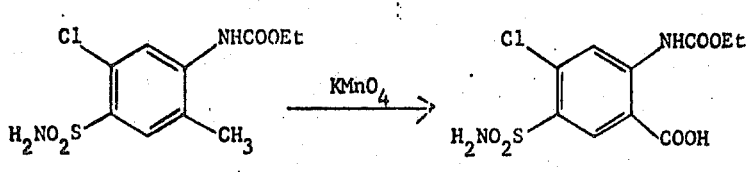

IV

N-Carbethoxy-4-chloro-5-sulfamylanthranilic acid

| | |
|---|---|
| N-Carbethoxy-4-chloro-2-methyl-5-sulfamylaniline | 125 g |
| Water | 7.5 l |
| $KMnO_4$ | 187 g |
| $MgSO_4 \cdot 7H_2O$ | 270 g |

Charged to a 12 liter flask the sulfonamide, which had been ground to pass through a No. 20 sieve, the $MgSO_4$, and 4.5 liter water. The mixture was heated to 100°. Vigorous stirring is important. When the temperature reached 98° foaming occurred. The heat was turned off for a few minutes and the foam subsided. The $KMnO_4$ was added to 3 liter water and heated to 50°-60° with stirring and kept at this temperature. The $KMnO_4$ solution was added to the reaction mixture over 4 hours. During the first 15 minutes of the addition the foam disappeared completely and there was no further foaming during the reaction. Stirred at 100° ½ hour after addition of $KMnO_4$ complete. No unused $KMnO_4$ at this point. Added 225 g $Na_2CO_3 \cdot H_2O$ and filtered. $MnO_2$ washed with water (1.2 l). Filtrate cooled overnight at room temperature and refiltered to remove starting material. (If it is desired the reaction mixture after addition of $Na_2CO_3$ can be cooled overnight and filtered. This would eliminate one filtration.) The filtrate was heated to 80° and acidified with concentrated HCl (350 ml). It was found that precipitation of the product at room temperature gave a low melting product (about 195°-205°) which appeared to be a hydrate. The mixture was left overnight at room temperature and filtered, washed with water and air dried to give 86 g mp 249°-50°. TLC = product, no starting material. After the acidification the product is very slow filtering. The filtration is much faster if the mixture is left overnight before filtering. In previous experiments use of 10% excess $KMnO_4$ did not reduce the amount of starting material left over at the end of the reaction. Starting material recovered was 12.5 g, mp 206°-8°, TLC = same as starting material. Yield of product = 63% (75% if corrected for recovered starting material).

Step V.

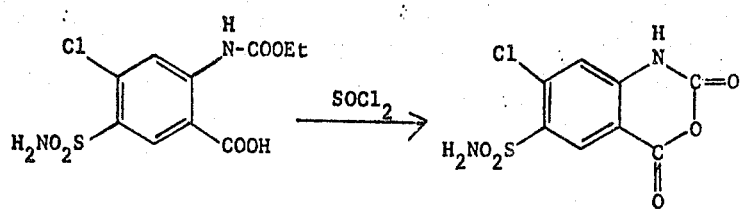

V

7-Chloro-6-sulfamylisatoic anhydride

| | |
|---|---|
| N-Carbethoxy-4-chloro-5-sulfamylanthranilic acid | 84 g |
| Dioxane | 650 ml |
| Thionyl chloride | 58 ml |

Mixed all starting materials together and heated to reflux. The mixture was refluxed for 1/2 hour after the evolution of acid vapors ceased. Total reflux time was about 1 hour. The mixture was cooled to 15° and filtered. The solid was sucked as dry as possible and then washed with 3 portions of dioxane (65 ml each), finally with 250 ml ether. The solid was dried to give 63 g, mp 285°-90° (mp not sharp and varies from batch to batch). The product was a grey solid considerably darker than the isatoic anhydride produced by the method presently used for 720-22. However, it is not practical to recrystallize the isatoic anhydride intermediate. Some additional purification may be necessary in the next step (reaction with o-toluidine).

Step VI.

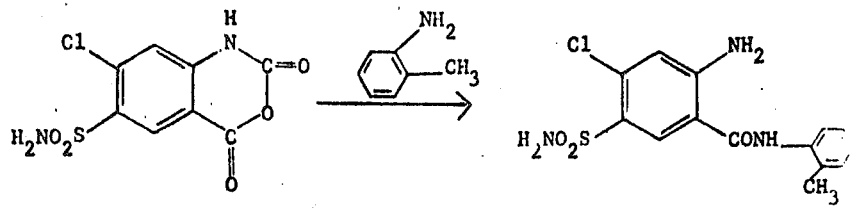

V           VI

2-Amino-4-chloro-5-sulfamyl-N-(o-tolyl) benzamide

7-Chloro-6-sulfamyl-isatoic anhydride (60 g) and 180 ml distilled o-toluidine were heated under nitrogen at 178° for 15 minutes and cooled slowly to room temperature. Ether (240 ml) was added and the mixture stirred 15 minutes. The solid was filtered, washed with 210 ml isopropanol, 210 ml 8% NH₄OH, 170 ml water, 135 ml isopropanol, 135 ml ether and dried to give 47.3 g, mp 281°-3°. TLC was the same as a known sample of the product.

Step VII(a)

Preparation of 2-Methyl-3-(o-tolyl)-6-sulfamyl-7-chloro-1,2,3,4-tetrahydro-4-quinazolinone 2-Amino-4-chloro-5-sulfamyl-N-(o-tolyl)-benzamide (685 gm.) was slurried in 700 ml. glacial acetic acid. To this slurry was added 240 gm. (280 ml) dimethyl acetal and 4 ml. concentrated sulfuric acid. The reaction mixture was stirred for 3-1/2 hours, then filtered and washed thoroughly with ether. The yield of crude material was 685 gm. and it melted at 252°-253°. This was recrystallized from 25 liters of 95% ethanol by dissolving hot, cooling and concentrating to half volume under reduced pressure at 30°. Weight of the first crop = 664 gm., M.P. 246°-250° (240°-243°).

| | C | H | N |
|---|---|---|---|
| Analysis: Calcd. for $C_{16}H_{16}ClN_3O_3S$: | 52.53 | 4.41 | 11.49 |
| Found: | 52.38 | 4.45 | 11.53 |
| | Cl | S | |
| | 9.69 | 8.76 | |
| | 9.70 | 8.90 | |

The filtrates from the recrystallization were concentrated down to half volume and a further 251 gm. product was obtained. Concentration of this filtrate to half volume gave another 196 gm. product which was recrystallized again from 450ml. 95% ethanol by concentration to half volume at 30° under vacuum, yielding 151 gm. of product. This portion was combined with the 251 gm. portion obtained above. Total weight: 402 gm., m.p. 247°-252° (227.5°-231.5°)

| Analysis: | C | H | N | Cl | S |
|---|---|---|---|---|---|
| Calcd. for $C_{16}H_{16}ClN_3O_3S$: | 52.53 | 4.41 | 11.49 | 9.69 | 8.76 |
| Found: | 52.38 | 4.47 | 11.74 | 9.70 | 9.05 |

Step VII(b)

Preparation of 3-(o-tolyl)-6-sulfamyl-7-chloro-1,2,3,4-tetrahydro-4-quinazolinone Dimethoxymethane (11.3 ml.) was added dropwise over 5 minutes to a mixture of 40.8 gm. 2-amino-4-chloro-5-sulfamyl-N-(o-tolyl)-benzamide, 400 ml. acetic acid, and 12 ml. sulfuric acid. The mixture was stirred 6 hours, poured into 3.5 liters of water and the solid filtered and washed with water. The dried solid was purified by chromatography on silica to give 24.2 gm. product which was recrystallized twice from alcohol (800 and 600 ml.) to give 15 gm. of product, m.p. 250°-3.5°.

| | C | H | Cl | N |
|---|---|---|---|---|
| Calcd.: | 51.21 | 4.01 | 10.08 | 11.94 |
| Found: | 51.27 | 3.95 | 9.86 | 12.21 |
| | | | 10.08 | |

Methods of preparing various benzamides from isatoic anhydrides obtained by the process of this invention, and other quinazolinones of the general formula first above written from various benzamides are disclosed in my copending application Ser. No. 874,960, filed Nov. 7, 1969, which is hereby incorporated by reference, particular attention being called to Procedures VI, XI-XV, XIX, XXII-XXXI and Examples 2-54.

It also will be understood that the sulfamyl group $SO_2NH_2$ can be readily converted to

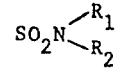

where $R_1$ is hydrogen, alkyl or aryl and $R_2$ is the same, by conventional means and as disclosed in my copending application Ser. No. 874,960.

I claim:
1. In a process for the preparation of 6-sulfamyl-1,2,3,4-tetrahydro-4-quinazolinone represented by the formula

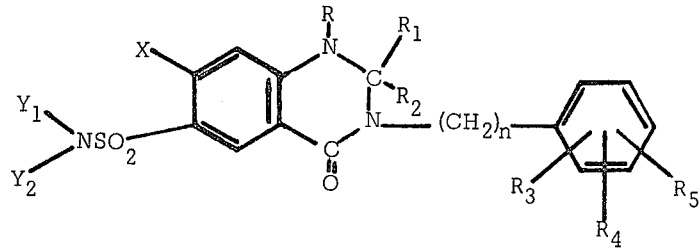

or a salt thereof wherein X is halogen or trifluoromethyl; $Y_1$ and $Y_2$ are independently hydrogen, alkyl or acyl; R is hydrogen, alkyl, aryl or aralkyl; $R_1$ and $R_2$ are independently hydrogen, alkyl, haloalkyl, hydroxyalkyl, alkoxyalkyl, thioalkyl, alkylthioalkyl, haloalkylthioalkyl, arylthioalkyl, cycloalklyl, cycloalkylalkyl, aryl or aralkyl; $R_1$ and $R_2$ taken together with the carbon atom to which they are attached are a cycloalkyl group or a heterocyclic group; n is 0 or an integer from 1 to 4; and $R_3$, $R_4$ and $R_5$ are independently hydrogen, alkyl, alkoxy, hydroxy, halogen, trifluoromethyl, the radical $-SO_2NH_2$, or amino; wherein a 5-halo-2-lower alkyl aniline of the formula

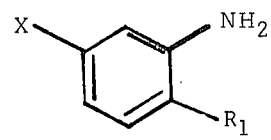

wherein X is halogen or trifluoromethyl and $R_1$ is lower alkyl, is converted to a 7-halo-6-sulfamylisatoic anhydride of the formula

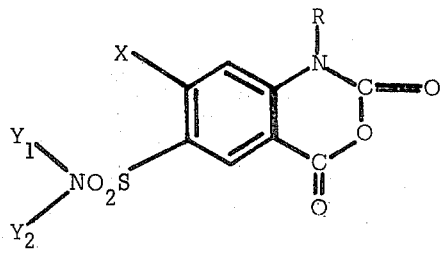

and then to a benzamide of the formula

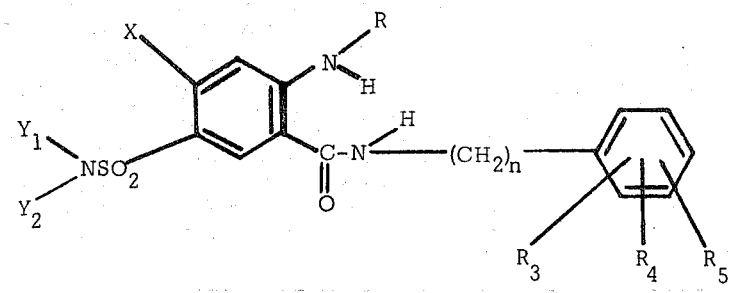

and said benzamide is reacted with an acetal, aldehyde or ketone represented, respectively, by the formula

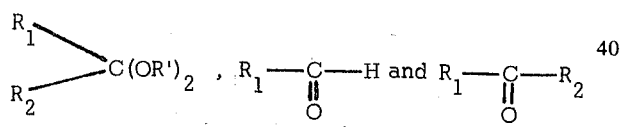

wherein R' is a hydrocarbon group; and, a. when R is benzyl, optionally hydrogenating the product thus obtained to replace said benzyl with a hydrogen atom, b. when $Y_1$ and $Y_2$ are hydrogen, optionally reacting the product thus obtained with an alkylating or acylating agent to replace at least one of the hydrogen atoms with an alkyl or acyl group, respectively, and, optionally, reacting the resulting product with an acid or a base to provide a salt, the improvement comprising reacting a 7-halo-6-sulfamylisatoic anhydride of the formula

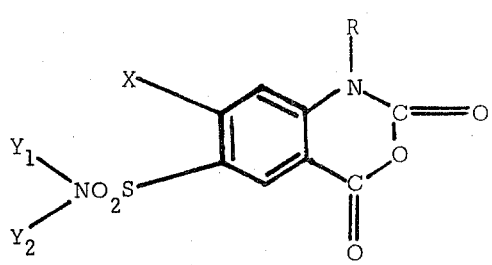

with an amine having the formula

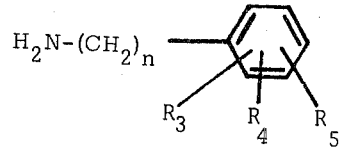

to produce a benzamide of the formula

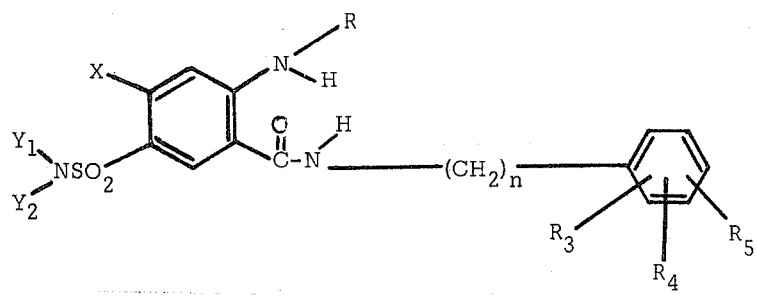

2. The process of claim 1 wherein 7-chloro-6-sulfamylisatoic anhydride of the formula

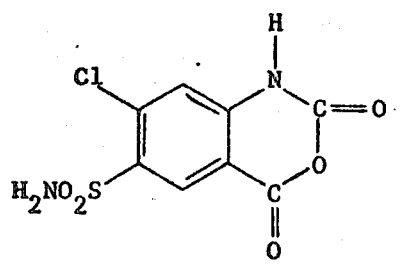

is reacted with o-toluidine to produce 2-amino-4-chloro-5-sulfamyl-N-(o-tolyl) benzamide of the formula

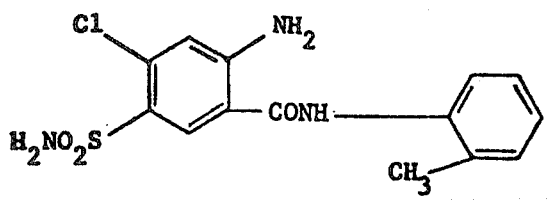

3. A process according to claim 2 wherein
the reaction is carried out by heating the 7-chloro-6-sulfamylisatoic anhydride with o-toluidine under an inert gas at 150°-190°C.

4. A process according to claim 3 wherein the o-toluidine is present in molar excess over the 7-chloro-6-sulfamylisatoic anhydride.

* * * * *